(12) United States Patent
Yamamoto et al.

(10) Patent No.: US 8,514,674 B2
(45) Date of Patent: Aug. 20, 2013

(54) OPTICAL INFORMATION RECORDING MEDIUM REPRODUCING APPARATUS, METHOD FOR REPRODUCING OPTICAL INFORMATION RECORDING MEDIUM, PROGRAM FOR REPRODUCING OPTICAL INFORMATION RECORDING MEDIUM, AND COMPUTER READABLE RECORDING MEDIUM

(75) Inventors: Masaki Yamamoto, Osaka (JP);
Hirohisa Yamada, Osaka (JP); Yasuhiro Harada, Osaka (JP); Hideharu Tajima, Osaka (JP); Jun Akiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 453 days.

(21) Appl. No.: 12/588,181

(22) Filed: Oct. 7, 2009

(65) Prior Publication Data
US 2010/0091638 A1 Apr. 15, 2010

(30) Foreign Application Priority Data
Oct. 9, 2008 (JP) ................................ 2008-262745

(51) Int. Cl.
*G11B 11/00* (2006.01)
*G11B 7/00* (2006.01)

(52) U.S. Cl.
USPC ..................................... 369/13.54; 369/124.1

(58) Field of Classification Search
None
See application file for complete search history.

(56) References Cited

U.S. PATENT DOCUMENTS

| 6,845,074 | B1 | 1/2005 | Fujita | |
| 2002/0145956 | A1 | 10/2002 | Okumura et al. | |
| 2007/0274185 | A1* | 11/2007 | Kikukawa et al. | 369/59.1 |
| 2009/0034391 | A1 | 2/2009 | Aoki et al. | |

FOREIGN PATENT DOCUMENTS

| JP | 06-162564 | 6/1994 |
| JP | 07-307025 | 11/1995 |
| JP | 2001-056939 | 2/2001 |
| JP | 2001-291239 | 10/2001 |
| JP | 2002-260308 | 9/2002 |
| JP | 2004-234719 | 8/2004 |
| JP | 2008-276839 | 11/2008 |
| WO | WO-2007-029430 | 3/2007 |

* cited by examiner

*Primary Examiner* — Joseph Haley
*Assistant Examiner* — Carl Adams
(74) *Attorney, Agent, or Firm* — Edwards Wildman Palmer LLP; George W. Neuner

(57) ABSTRACT

An optical information recording medium reproducing apparatus 1 includes: a signal detecting/extracting section 15 extracting, from reproduction signal data, extracted reproduction signal data corresponding to a predetermined data pattern; a calculating circuit 10 calculating, from the extracted reproduction signal data, a reproducing power control value for controlling laser light reproducing power; and a reproducing power control section 16 controlling the reproducing power based on the reproducing power control value. The predetermined data pattern is obtained from a space which is sandwiched between marks of $\lambda/2NA$ or longer and is shorter than $\lambda/4NA$ and/or a mark which is sandwiched between spaces of $\lambda/2NA$ or longer and is shorter than $\lambda/4NA$. Therefore, even when environmental temperature changes in reproduction, the optical information recording medium reproducing apparatus capable of reproducing a super resolution medium including marks each shorter than $\lambda/4NA$ optimally controls laser light reproducing power and prevents degradation of reproduction signal quality.

7 Claims, 6 Drawing Sheets

FIG. 2
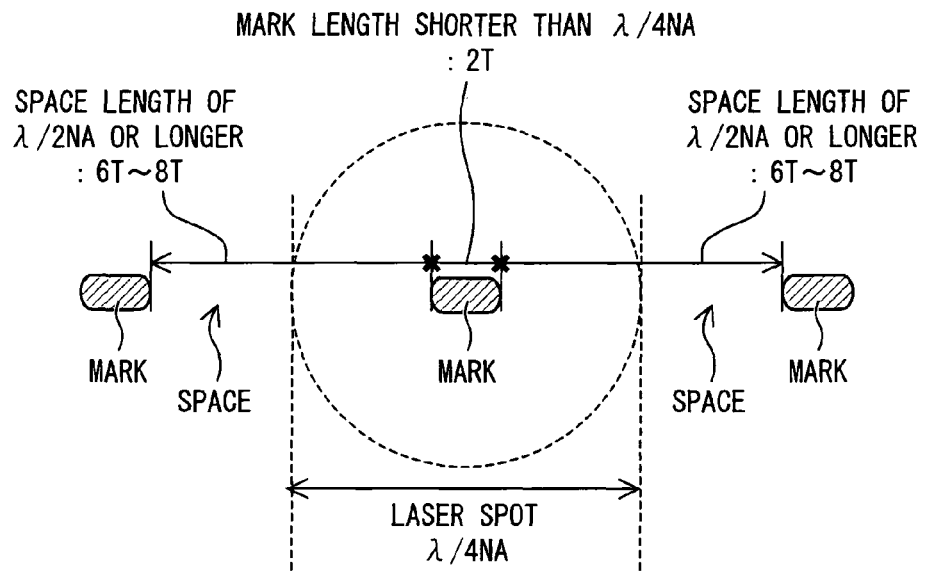
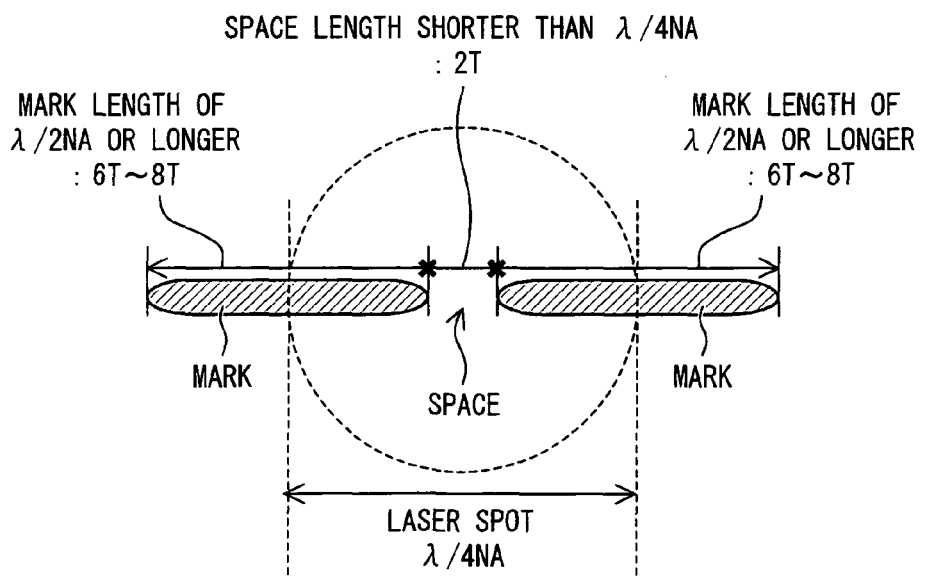

F I G. 5
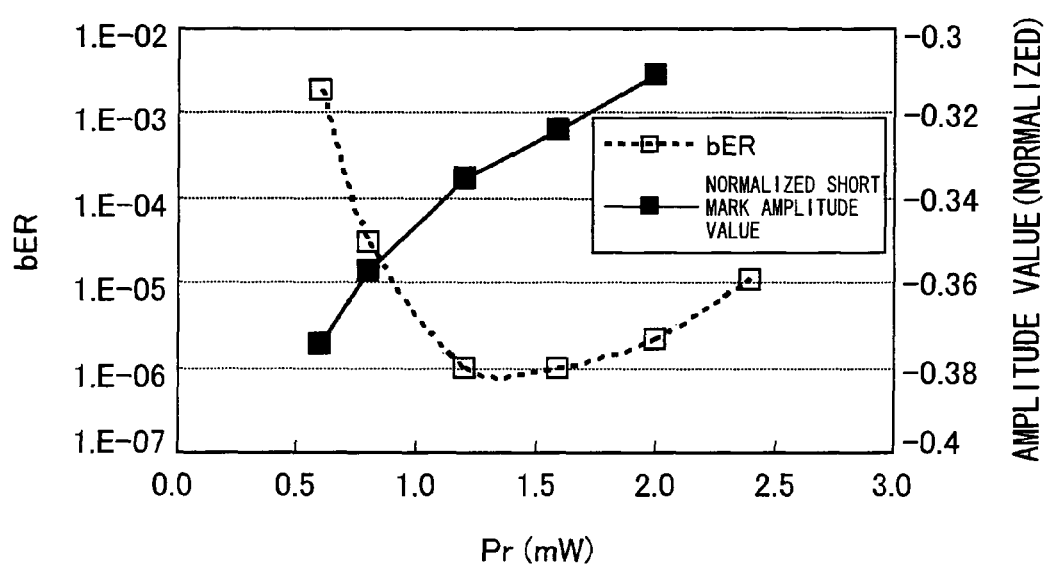

OPTICAL INFORMATION RECORDING MEDIUM REPRODUCING APPARATUS, METHOD FOR REPRODUCING OPTICAL INFORMATION RECORDING MEDIUM, PROGRAM FOR REPRODUCING OPTICAL INFORMATION RECORDING MEDIUM, AND COMPUTER READABLE RECORDING MEDIUM

This Nonprovisional application claims priority under 35 U.S.C. §119(a) on Patent Application No. 2008-262745 filed in Japan on Oct. 9, 2008, the entire contents of which are hereby incorporated by reference.

TECHNICAL FIELD

The present invention relates to an optical information recording medium reproducing apparatus capable of reproducing particularly an optical information recording medium in which information is recorded with a high density, a method for reproducing such an optical information recording medium, a program for reproducing such an optical information recording medium, and a computer readable recording medium.

BACKGROUND ART

In recent years, in order to process huge volumes of information such as video at high speed, there is need for increasing an information density for recording and reproducing an optical information recording medium. In order to respond to this, a super resolution technique is proposed which records information with a mark string including a shortest mark length shorter than an optical resolution limit (hereinafter, simply referred to as "resolution limit") of an optical information recording medium reproducing apparatus (hereinafter, simply referred to as "reproducing apparatus") and which reproduces the information thus recorded.

The "resolution limit" is determined by (i) a wavelength $\lambda$ of a reproducing laser light source of the reproducing apparatus and (ii) a numerical aperture NA of an objective lens of the reproducing apparatus, and is theoretically represented by $\lambda/4NA$. A "mark" refers to a recording mark of a rewritable or write-once optical information recording medium and a prepit of a reproduction-dedicated optical information recording medium. A "space" refers to a space which is sandwiched between the marks and is in a rotational direction of an optical information recording medium.

Various super resolution techniques are now proposed, examples of which encompass a super resolution technique using a thermochromic film and a super resolution technique using a photochromic film.

For example, a super resolution medium described in Patent Literature 1 has a reflective layer whose surface from which reproducing light enters is provided with a thermochromic dye layer, which serves as a mask layer and changes its optical properties (e.g., a transmission rate) depending on the temperature. The mask layer refers to a layer that causes a super resolution phenomenon such as reducing a laser spot in a pseudo manner.

In the super resolution medium described in Patent Literature 1, a laser spot has a temperature distribution corresponding to a light-intensity distribution, and the temperature distribution causes a transmission rate distribution in a reproducing layer, which is close to the surface from which reproducing light enters.

For example, in a case where the reproducing layer is made of a material whose transmission rate increases as the temperature rises, setting the reproducing apparatus to have a predetermined reproducing power increases a transmission rate of only a part where a laser spot temperature is high. Consequently, the laser spot formed on the reflective surface is reduced in a pseudo manner. This makes it possible to reproduce a signal of a prepit string including a shortest mark length, which is shorter than the resolution limit of the reproducing apparatus.

However, in a case where such the super resolution medium is reproduced, the following case may occur: Even if a driving current for generating laser light is maintained constant, an optimum reproducing power of laser light varies depending the environmental temperature changing at the time of reproduction. If the reproducing power has a value lower than the optimum value, the super resolution effect is insufficient and accordingly the reproducing signal quality is degraded. The reason for this is assumed to be an insufficient reduction of the laser spot. If the reproducing power has a value higher than the optimum value, the reproducing signal quality is degraded too. The reason for this is assumed to be that the degree of reduction of the laser spot deviates from an optimum degree.

Here, the reproduction signal quality refers to, for example, jitter or bER. The jitter is an indicator indicative of a fluctuation of a reproduction signal in a time axis direction. The bER is a bit error rate of a reproduction signal. Each of the jitter and the bER is one of indicators indicative of reproduction signal characteristics provided by a medium. A smaller value of each of the jitter and the bER indicates better reproduction signal characteristics.

Thus, since Patent Literature 1 does not describe how the reproducing power is controlled, Patent Literature 1 has a problem that an optimum reproducing power of laser light varies depending on the environmental temperature changing at the time of reproduction and accordingly the reproduction signal quality is degraded.

In order to solve this problem, Patent Literature 2 detects an amplitude value of a reproduction signal obtained from phase pits which are formed in a power setting region of the optical disc and have approximately $2NA/\lambda$ of a special frequency, detects a peak value of the reproduction signal at a direct current level, and sets an output power of the light source so that a value (i) obtained by dividing the amplitude value by the peak value becomes maximum. This optimizes an area of a window section or a mask section in a region onto which a light spot is irradiated, thereby leading to favorable signal reproduction. Further, also in reproducing an optical disc not provided with the power setting region, an amplitude value of a shortest mark (3T; "T" represents a channel bit length) and an amplitude value of a longest mark (11T) are detected from the reproduction signal, and values (ii) obtained by dividing the amplitude values by a detected peak value are used to control an output power of the light source. This leads to favorable signal reproduction.

Patent Literature 2 controls the reproducing power so that the values (i) and (ii) become maximum. In addition to this, there is a conventionally-used method for controlling a reproducing power so that the values (i) and (ii) become close to recorded reference values, so that a degree of reduction of a laser spot is maintained optimum, for the purpose of preventing degradation of a reproduction signal quality.

Citation List

Patent Literature 1

Japanese Patent Application Publication, Tokukaihei, No. 6-162564 A (Publication Date: Jun. 10, 1994)

Patent Literature 2

Japanese Patent Application Publication, Tokukaihei, No. 7-307025 A (Publication Date: Nov. 21, 1995)

SUMMARY OF INVENTION

Technical Problem

However, with the foregoing conventional techniques, a reproducing apparatus for reproducing a super resolution medium including marks each having a mark length shorter than $\lambda/4NA$ has the following problems which are caused by a very strong intersymbol interference:

As illustrated in FIG. 11 of Patent Literature 2, an optimum reproducing power for a super resolution medium varies depending on the mark length. The reason for this is assumed to be that an optimum degree of reduction of a laser spot i.e., an optimum area of a window section or a mask section in a region onto which a light spot is irradiated varies depending on the mark length.

In view of this, in utilizing a mark string of a certain frequency i.e., a mark string including only a certain mark length and a certain space length to control a reproducing power so that the reproducing power becomes optimum, it is common to utilize, for such the control, a mark string including only a shortest mark length and a shortest space length, each of whose reproduction signal characteristics are most affected by the reproducing power.

However, because of the aforementioned reason, the reproducing power control method of Patent Literature 2, which utilizes an amplitude value of a reproduction signal obtained from phase pits having approximately $2NA/\lambda$ of a special frequency, is not suitable, except for in a case where the shortest mark is approximately $\lambda/4NA$. Further, in a case where a shortest mark length is shorter than $\lambda/4NA$, it is impossible to carry out the above-described reproducing power control using an amplitude since a strong intersymbol interference prevents detection of a change in amplitude of a mark string including only a shortest mark length and a shortest space length, which change is caused by the reproducing power.

Further, in a case of detecting an amplitude value of a shortest marks from a reproduction signal in which marks of various mark lengths are recorded, the following case occurs: If the shortest mark length is shorter than $\lambda/4NA$, a strong intersymbol interference causes signal levels of the shortest marks to be different from each other depending on the lengths of spaces ahead of and behind each shortest mark and/or the lengths of marks ahead of or behind each of the spaces.

This leads to a significantly great variation in the amplitude value of the shortest marks, thereby making it impossible to carry out the reproducing power control using an amplitude value of a shortest mark.

The present invention was made in view of the foregoing problems, and an object of the present invention is to provide: an optical information recording medium reproducing apparatus for reproducing a super resolution medium including marks each having a mark length shorter than $\lambda/4NA$, for controlling a reproducing power so that the reproducing power becomes optimum even if an environmental temperature changes at the time of reproduction, for obtaining high-quality reproduction signal data, and for preventing degradation of a reproduction signal quality; a method for reproducing such an optical information recording medium; a program for reproducing such an optical information recording medium; and a computer readable recording medium.

Solution to Problem

In order to solve the foregoing problems, an optical information recording medium reproducing apparatus according to the present invention includes: an optical system including (i) a laser light source for emitting laser light having a wavelength of $\lambda$ nm and (ii) an objective lens having a numerical aperture NA, said optical information recording medium reproducing apparatus emitting the laser light to an optical information recording medium, in which marks and spaces formed between any adjacent ones of the marks are recorded as information, so as to reproduce the information recorded and acquire reproduction signal data, said optical information recording medium reproducing apparatus being capable of reproducing the optical information recording medium including marks each having a mark length shorter than $\lambda/4NA$, said optical information recording medium reproducing apparatus, further including: a signal extracting section for detecting a predetermined data pattern from the reproduction signal data, and for extracting, as extracted reproduction signal data, part of the reproduction signal data which part corresponds to the predetermined data pattern detected; a reproducing power control value finding section for finding, from the extracted reproduction signal data extracted by the signal extracting section, a reproducing power control value for controlling a reproducing power of the laser light; and a reproducing power control section for controlling the reproducing power of the laser light, in accordance with a comparison between the reproducing power control value and a predetermined reference value or a reference value which is determined by test-reading of the optical information recording medium, the predetermined data pattern being a data pattern which is defined by (i) a space which has a space length shorter than $\lambda/4NA$ and is sandwiched between marks each having a mark length of $\lambda/2NA$ or longer and/or (ii) a mark which has a mark length shorter than $\lambda/4NA$ and is sandwiched between spaces each having a space length of $\lambda/2NA$ or longer.

In order to solve the foregoing problems, a method for causing an optical information recording medium reproducing apparatus according to the present invention is a method for causing an optical information recording medium reproducing apparatus to reproduce an optical information recording medium, said optical information recording medium reproducing apparatus including: an optical system including (i) a laser light source for emitting laser light having a wavelength of $\lambda$ nm and (ii) an objective lens having a numerical aperture NA, said optical information recording medium reproducing apparatus emitting the laser light to an optical information recording medium, in which marks and spaces formed between any adjacent ones of the marks are recorded as information, so as to reproduce the information recorded and acquire reproduction signal data, said method reproducing the optical information recording medium including marks each having a mark length shorter than $\lambda/4NA$, said method including the steps of: (i) detecting a predetermined data pattern from the reproduction signal data, and extracting, as extracted reproduction signal data, part of the reproduction signal data which part corresponds to the predetermined data pattern detected; (ii) finding, from the extracted reproduction signal data extracted in the step (i), a reproducing power control value for controlling a reproducing power of the laser light; and (iii) controlling the reproducing power of the laser light, in accordance with a comparison between the reproducing power control value and a predetermined reference value or a reference value which is determined by test-reading of the optical information recording medium, the predetermined data pattern being a data pattern which is defined by (a) a space which has a space length shorter than $\lambda/4NA$ and is sandwiched between marks each having a mark length of $\lambda/2NA$ or longer and/or (b) a mark which has a mark length shorter than $\lambda/4NA$ and is sandwiched between spaces each having a space length of $\lambda/2NA$ or longer.

According to this configuration, laser light having the wavelength $\lambda$ is emitted through the objective lens having the numerical aperture NA to the optical information recording medium, in which marks and spaces formed between any adjacent ones of the marks are recorded as information. Then, for example, by receiving reflected light from the optical information recording medium, it is possible to acquire, as reproduction signal data, the information recorded in the optical information recording medium.

Upon detection of the predetermined data pattern from the reproduction signal data acquired, the signal extracting section extracts, from the reproduction signal data, reproduction signal data corresponding to the predetermined data pattern detected, as extracted reproduction signal data.

The reproducing power control value finding section acquires the extracted reproduction signal data extracted by the signal extracting section, and finds a reproducing power control value for controlling the laser light.

Then, the reproducing power control section controls the reproducing power of the laser light, in accordance with a result of comparison between the reproducing power control value and the reference value.

Here, in order to obtain reproduction signal data having a certain quality from the optical information recording medium, (i) the predetermined reference value for controlling a reproducing power of laser light or (ii) the reference value determined by test-reading of the optical information recording medium is set in advance. This makes it possible to acquire reproduction signal data having a certain quality from the optical information recording medium.

Examples of the reference value encompass a differential (amplitude) value between (i) reproduction signal data obtained from a shortest mark having a shortest mark length, which reproduction signal data is extracted from reproduction signal data acquired from an optical information recording medium, and (ii) reproduction signal data obtained from a shortest space having a shortest space length, which reproduction signal data is extracted from the reproduction signal data acquired from the optical information recording medium.

However, as described above, even with the reference value set in advance, a reproducing power of laser light allowing reproduction signal data to be acquired from a mark shorter than $\lambda/4NA$ varies depending on the environmental temperature measured at the time of operation (reproducing operation) of the optical information recording medium reproducing apparatus.

In order to deal with this, as in the above-mentioned configuration, the reproducing power control section controls the reproducing power of the laser light, in accordance with a comparison between the reproducing power control value and the reference value.

With this, it is possible to optimize the reproducing power of the laser light in accordance with the strength (signal level) of the reproduction signal data that the signal extracting section has acquired. That is, it is possible to control the reproducing power of the laser light so that the reproducing power becomes optimum in response to an environmental temperature change occurring at the time of operation of the apparatus, and accordingly to prevent degradation of a reproduction signal data quality.

Here, a strength (signal level) of reproduction signal data obtained from a mark and/or a space each shorter than $\lambda/4NA$, which is equal to or shorter than a theoretical resolution limit, varies depending on the reproducing power of the laser light, due to a super resolution effect. Further, the signal level varies depending on the lengths of spaces ahead of and behind said mark and/or the lengths of marks ahead of and behind said space, due to an intersymbol interference.

In order to deal with this, the mark shorter than $\lambda/4NA$ is sandwiched between spaces of $\lambda/2NA$ or longer, and/or the space shorter than $\lambda/4NA$ is sandwiched between marks of $\lambda/2NA$ or longer. This reduces a degree of a variation in the signal level(s) obtained from the mark and/or the space each shorter than $\lambda/4NA$, which variation is caused by the intersymbol interference.

The reason for this is that a laser spot is represented by approximately $\lambda/NA$. For example, in the case where a mark shorter than $\lambda/4NA$ is sandwiched between spaces of $\lambda/2NA$ or longer, the laser spot includes only one mark, that is, only the mark shorter than $\lambda/4NA$.

Therefore, in the case of reproducing the optical information recording medium including marks each having a mark length shorter than $\lambda/4NA$, carrying out the reproducing power control with use of a reproducing power control value found from extracted reproduction signal data extracted in accordance with the data pattern including (i) a space which has a space length shorter than $\lambda/4NA$ and is sandwiched between marks each having a mark length of $\lambda/2NA$ or longer and/or (ii) a mark which has a mark length shorter than $\lambda/4NA$ and is sandwiched between spaces each having a space length of $\lambda/2NA$ or longer allows the optical information recording medium reproducing apparatus, which is capable of acquiring reproduction signal data from marks each having a mark length shorter than $\lambda/4NA$, to control the reproducing power so that the reproducing power becomes optimum in order to acquire high-quality reproduction signal data, and to prevent degradation of a reproduction signal quality, even if the environmental temperature changes at the time of reproduction.

Also in comparison with a case of using, as the reproducing power control value, an amplitude value of a mark and a space each shorter than $\lambda/4NA$ i.e., an amplitude value found from extracted reproduction signal data corresponding to a data pattern including the mark and the space which are shorter than $\lambda/4NA$, which have the same channel bit length, and which are sandwiched between a mark of $\lambda/2NA$ or longer and a space of $\lambda/2NA$ or longer (e.g., a 6T mark—a 2T space—a 2T mark—a 6T space), the foregoing effort allows the reproducing power control to be carried out more stably even if the environmental temperature changes at the time of reproduction, and prevents degradation of a reproduction signal data quality more stably.

In a case of using, as the reproducing power control value, an amplitude value obtained from a mark string including only a shortest mark length and a shortest space length, there is a problem that it is impossible to detect a change in the amplitude of the mark string including the shortest mark length and the shortest space length, which change is caused by the reproducing power. On the other hand, the foregoing effort can prevent this problem. In a case of using, as the reproducing power control value, an amplitude value of a shortest mark extracted from a reproduction signal in which marks of various mark lengths are recorded, there is a problem that the value has a great variation caused by an intersymbol interference. On the other hand, the foregoing effort can prevent this problem.

Thus, the foregoing effort makes it possible to optimally carry out the control of a reproducing power of laser light even if the environmental temperature changes at the time of reproduction, and accordingly to prevent degradation of a reproduction signal data quality.

In the optical information recording medium reproducing apparatus of the present invention, it is preferable that: the optical information recording medium has a data recording region in which information data is recorded; and the signal extracting section extracts the extracted reproduction signal data from the information data recorded in the data recording region.

The data recording region herein refers to a region for recording information data and/or a region where information data is recorded. The information data refers to generally-used information data, examples of which encompass information data such as contents, image information data, and audio information data.

According to this, the signal extracting section extracts the extracted reproduction signal data from the information data recorded in the data recording region provided in the optical information recording medium.

With this, the signal extracting section can extract the predetermined data pattern from (i) a space which has a space length shorter than $\lambda/4NA$ and is sandwiched between marks each having a mark length of $\lambda/2NA$ or longer and/or (ii) a mark which has a mark length shorter than $\lambda/4NA$ and is sandwiched between spaces each having a space length of $\lambda/2NA$ or longer, each formed in the data recording region which is in the optical information recording medium and which records information data.

Therefore, it is not necessary to detect the predetermined data pattern from an optical information recording medium having a predetermined place which is not the data storing region and in which a specific pattern for controlling a reproducing power is formed. This provides an optical information recording medium reproducing apparatus having a high versatility.

In a conventional optical information recording medium provided with a reproducing power setting region where a specific pattern for controlling a reproducing power is recorded or such a specific pattern can be recorded, an area of a data recording region for recording information data is reduced for an area for the reproducing power setting region. On the other hand, as in the foregoing configuration, by carrying out the reproducing power control with use of the extracted reproduction signal data extracted from the information data recorded in the data recording region, it is possible to prevent a reduction in a usage rate of the data recording region in the optical information recording medium.

In the optical information recording medium reproducing apparatus of the present invention, it is preferable that the reproducing power control value finding section finds the reproducing power control value with use of a differential value between (i) a signal level of reproduction signal data obtained from a space which has a space length shorter than $\lambda/4NA$ and is sandwiched between marks each having a mark length of $\lambda/2NA$ or longer and (ii) a signal level of reproduction signal data obtained from a mark which has a mark length shorter than $\lambda/4NA$ and is sandwiched between spaces each having a space length of $\lambda/2NA$ or longer.

As in this configuration, obtaining a difference between (i) the signal level of the reproduction signal data obtained from the space shorter than $\lambda/4NA$ and (i) the signal level of the reproduction signal data obtained from the mark shorter than $\lambda/4NA$ enables to remove a noise component from the reproducing power control value, thereby allowing the reproducing power control to be carried out more stably. Further, in many cases, such the differential value more greatly changes depending on the reproducing power, than a signal level of only a space shorter than $\lambda/4NA$ or a signal level of only a mark shorter than $\lambda/4NA$ does. This allows the reproducing power control with a higher accuracy.

In the optical information recording medium reproducing apparatus of the present invention, it is preferable that: the signal extracting section extracts, from the reproduction signal data acquired, (i) reproduction signal data of a longest mark having a longest mark length and (ii) reproduction signal data of a longest space having a longest space length; and the reproducing power control value finding section finds the reproducing power control value with use of a value normalized with a differential value between (i) a signal level of the reproduction signal data of the longest mark and (ii) a signal level of the reproduction signal data of the longest space.

As in this configuration, by using, as the reproducing power control value, the value normalized with an amplitude value (i.e., the differential value between the signal levels of the longest mark and the longest space), it is possible to prevent a variation in (i) a signal level of reproduction signal data acquired from a mark or a space each shorter than $\lambda/4NA$ or (ii) an amplitude value of the reproduction signal data acquired from the mark and the space each shorter than $\lambda/4NA$, which variation is caused by e.g., a film thickness distribution of a material from which the optical information recording medium is made. This allows the reproducing power control with stability.

Further, also is a case where a property of an element (e.g., a photodiode) for converting reflected light into a voltage changes with time, for example, and a voltage outputted from the element in response to a certain amount of reproducing light changes, the foregoing configuration enables to carry out the reproducing power control with stability, since the value is normalized with the amplitude value, which is the differential value between the signal levels of the longest mark and the longest space.

Note that, normalizing a value with an amplitude value, which is a differential value between signal levels of a longest mark and a longest space, means dividing the value by the amplitude value, which is the differential value between the signal levels of the longest mark and the longest space.

In the optical information recording medium reproducing apparatus of the present invention, it is preferable that: the reproducing power control value found by the reproducing power control value finding section is an asymmetric value.

According to this configuration, by using, as the reproducing power control value, the asymmetry in addition to (i) the signal level of the reproduction signal data acquired from a mark or a space each shorter than $\lambda/4NA$ or (ii) the amplitude value of the reproduction signal data acquired from the mark and the space each shorter than $\lambda/4NA$, it is possible to carry out the reproducing power control with a higher accuracy.

Further, in a case of a super resolution medium in which an asymmetry changes more greatly depending on the reproducing power than (i) a signal level of reproduction signal data acquired from a mark or a space each shorter than $\lambda/4NA$ or (ii) an amplitude value of the reproduction signal data acquired from the mark and the space each shorter than $\lambda/4NA$ does, the use of the asymmetry as the reproducing power control value makes it possible to carry out the reproducing power control with a higher stability.

Note that the above-mentioned optical information recording medium reproducing apparatus may be realized by a computer. In this case, (i) an optical information recording medium reproducing program for causing a computer to operate as each of the foregoing sections so as to achieve the above-mentioned optical information recording medium reproducing apparatus by means of the computer and (ii) a computer readable recording medium storing the optical information recording medium reproducing program are also included in the scope of the present invention.

ADVANTAGEOUS EFFECTS OF INVENTION

As described above, an optical information recording medium reproducing apparatus according to the present invention includes: a signal extracting section for detecting a predetermined data pattern from the reproduction signal data, and for extracting, as extracted reproduction signal data, part of the reproduction signal data which part corresponds to the predetermined data pattern detected; a reproducing power control value finding section for finding, from the extracted reproduction signal data extracted by the signal extracting section, a reproducing power control value for controlling a reproducing power of the laser light; and a reproducing power control section for controlling the reproducing power of the laser light, in accordance with a comparison between the reproducing power control value and a predetermined reference value or a reference value which is determined by test-reading of the optical information recording medium, the predetermined data pattern being a data pattern which is defined by (i) a space which has a space length shorter than $\lambda/4NA$ and is sandwiched between marks each having a mark length of $\lambda/2NA$ or longer and/or (ii) a mark which has a mark length shorter than $\lambda/4NA$ and is sandwiched between spaces each having a space length of $\lambda/2NA$ or longer.

Further, a method for reproducing an optical information recording medium according to the present invention is a method for causing an optical information recording medium reproducing apparatus to reproduce an optical information recording medium, said optical information recording medium reproducing apparatus including: an optical system including (i) a laser light source for emitting laser light having a wavelength of $\lambda$ nm and (ii) an objective lens having a numerical aperture NA, said optical information recording medium reproducing apparatus emitting the laser light to an optical information recording medium, in which marks and spaces formed between any adjacent ones of the marks are recorded as information, so as to reproduce the information recorded and acquire reproduction signal data, said method reproducing the optical information recording medium including marks each having a mark length shorter than $\lambda/4NA$, said method including the steps of: (i) detecting a predetermined data pattern from the reproduction signal data, and extracting, as extracted reproduction signal data, part of the reproduction signal data which part corresponds to the predetermined data pattern detected; (ii) finding, from the extracted reproduction signal data extracted in the step (i), a reproducing power control value for controlling a reproducing power of the laser light; and (iii) controlling the reproducing power of the laser light, in accordance with a comparison between the reproducing power control value and a predetermined reference value or a reference value which is determined by test-reading of the optical information recording medium, the predetermined data pattern being a data pattern which is defined by (a) a space which has a space length shorter than $\lambda/4NA$ and is sandwiched between marks each having a mark length of $\lambda/2NA$ or longer and/or (b) a mark which has a mark length shorter than $\lambda/4NA$ and is sandwiched between spaces each having a space length of $\lambda/2NA$ or longer.

Thus, an optical information recording medium reproducing apparatus according to the present invention and a method according to the present invention reproduce a super resolution medium including marks each having a mark length shorter than $\lambda/4NA$, control a reproducing power so that the reproducing power becomes optimum even in a case where an environmental temperature changes at the time of reproduction, acquire high-quality reproduction signal data, and prevent degradation of reproduction signal quality.

BRIEF DESCRIPTION OF DRAWINGS

FIG. 1, showing one embodiment of the present invention, is a block diagram schematically illustrating how an optical information recording medium reproducing apparatus is arranged.

FIG. 2

(a) of FIG. 2 is a view schematically illustrating a mark which is formed on an optical information recording medium reproduced by the optical information recording medium reproducing apparatus, has a predetermined mark length, and is sandwiched between spaces each having a predetermined space length; (b) of FIG. 2 is a view schematically illustrating a space which has a predetermined space length and is sandwiched between marks each having a predetermined mark length.

FIG. 3

Figure 3:
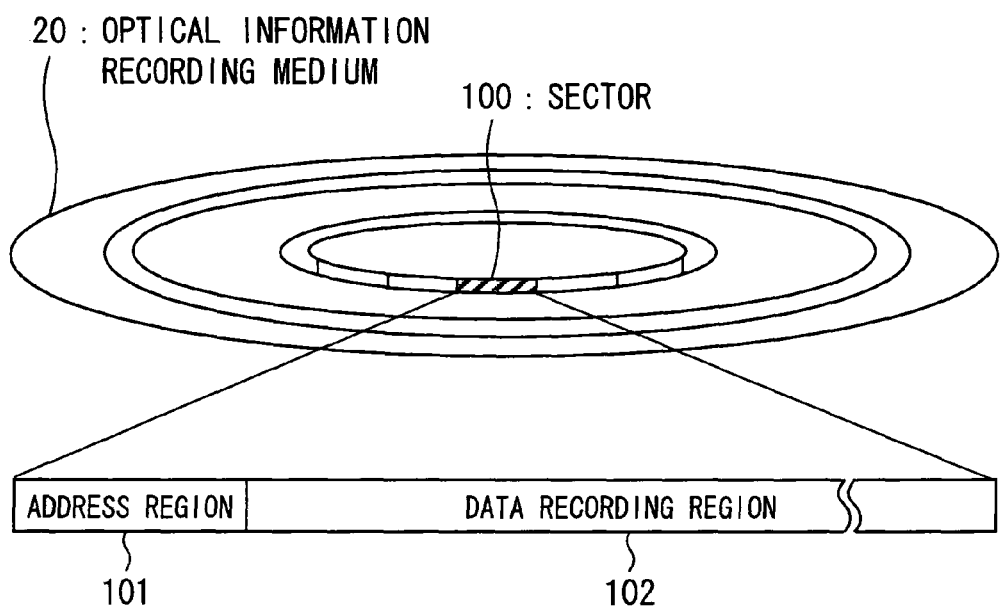

FIG. 3 is a view schematically illustrating how an optical information recording medium reproduced by the optical information recording medium reproducing apparatus is arranged.

FIG. 4

Figure 4:
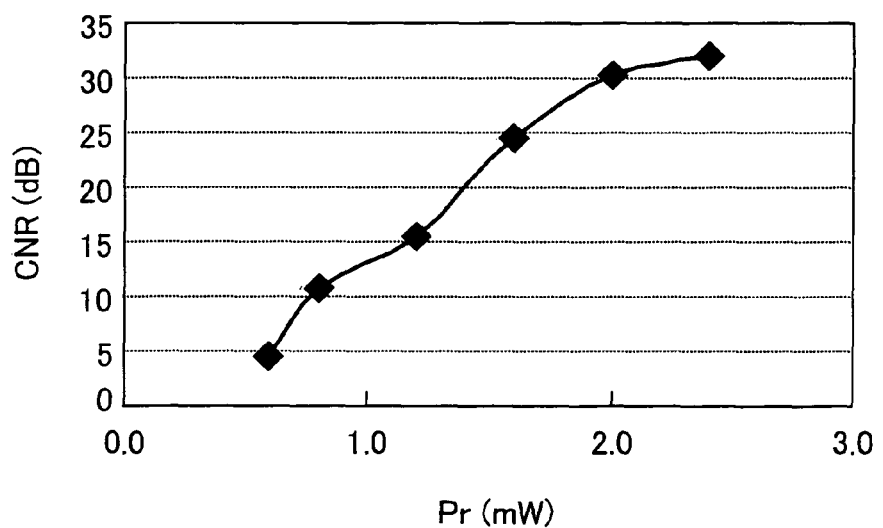

FIG. 4 is a graph illustrating how CNR depends on a reproducing power (Pr), observed in an optical information recording medium reproduced by the optical information recording medium reproducing apparatus.

FIG. 5

FIG. 5 is a graph illustrating how bER and a normalized short mark amplitude value depend on a reproducing power (Pr), observed in an optical information recording medium reproduced by the optical information recording medium reproducing apparatus.

FIG. 6

Figure 6:
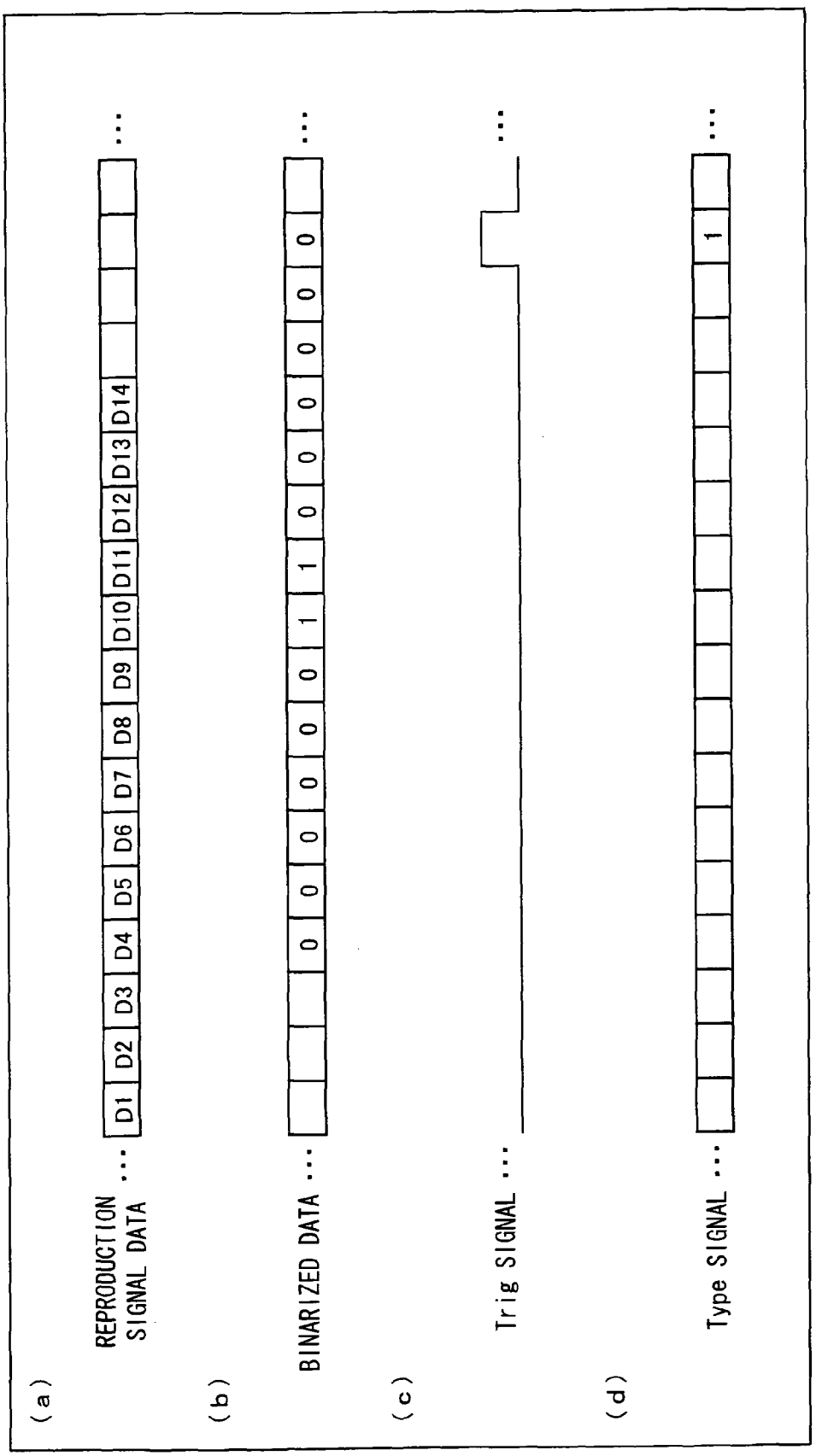

(a) of FIG. 6 schematically shows reproduction signal data acquired by the optical information recording medium reproducing apparatus; (b) of FIG. 6 schematically shows binarized data of the reproduction signal data shown in (a) of FIG. 6; (c) of FIG. 6 schematically shows a Trig signal outputted based on the binarized data shown in (b) of FIG. 6; (d) of FIG. 6 schematically shows a Type signal outputted based on the binarized data shown in (b) of FIG. 6.

FIG. 7

Figure 7:
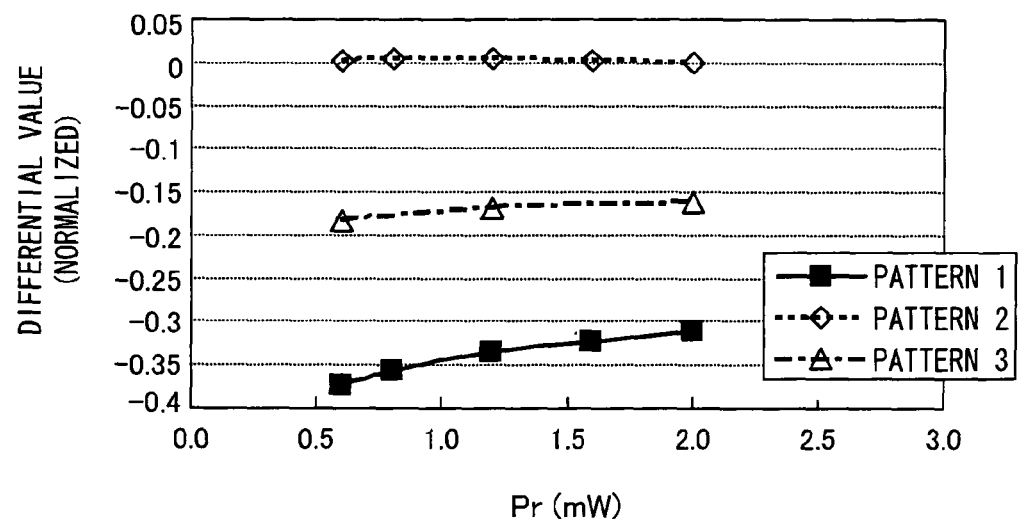

FIG. 7 is a graph, related to an optical information recording medium reproduced by the optical information recording medium reproducing apparatus, illustrating how much values obtained through normalization in which differential values between respective 2T space levels and respective 2T mark levels of three patterns are divided by respective longest mark amplification values depend on a reproducing power (Pr).

FIG. 8

Figure 8:
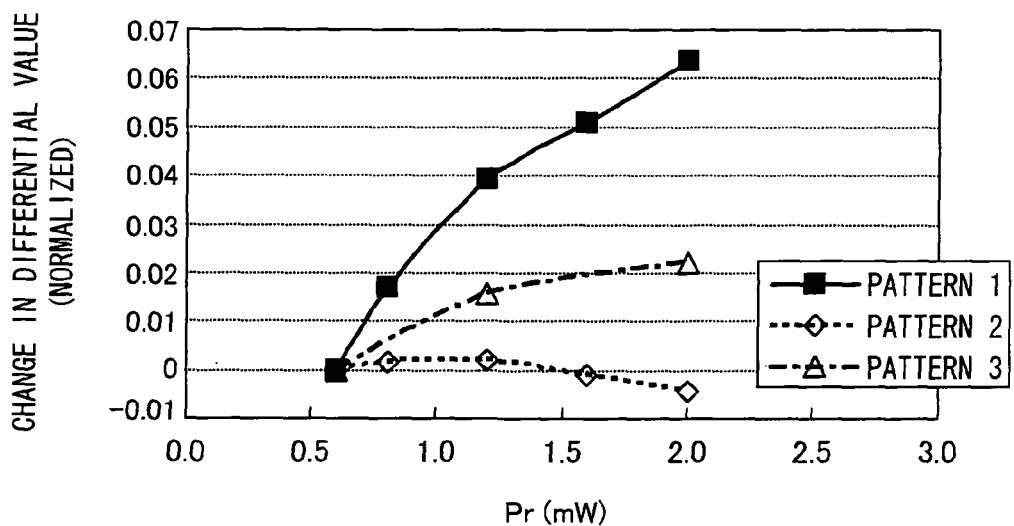

FIG. 8 is a graph illustrating, related to the optical information recording medium reproduced by the optical information recording medium reproducing apparatus, how much respective values (each represented by "a value along the vertical axis observed at each Pr—a value along the vertical axis observed at 0.6 mW") indicative of the amounts of changes in the values obtained through the normalization in which the differential values between the respective 2T space levels and the respective 2T mark levels of the three patterns are divided by the respective longest mark amplification values depend on a reproducing power (Pr), in a case where the respective values indicative of the amounts of changes are set to 0 at 0.6 mW.

DESCRIPTION OF EMBODIMENTS (Configuration of Optical Information Recording Medium Reproducing Apparatus 1)

One embodiment of the present invention is described below with reference to FIG. 1 through FIG. 8.

Figure 1:
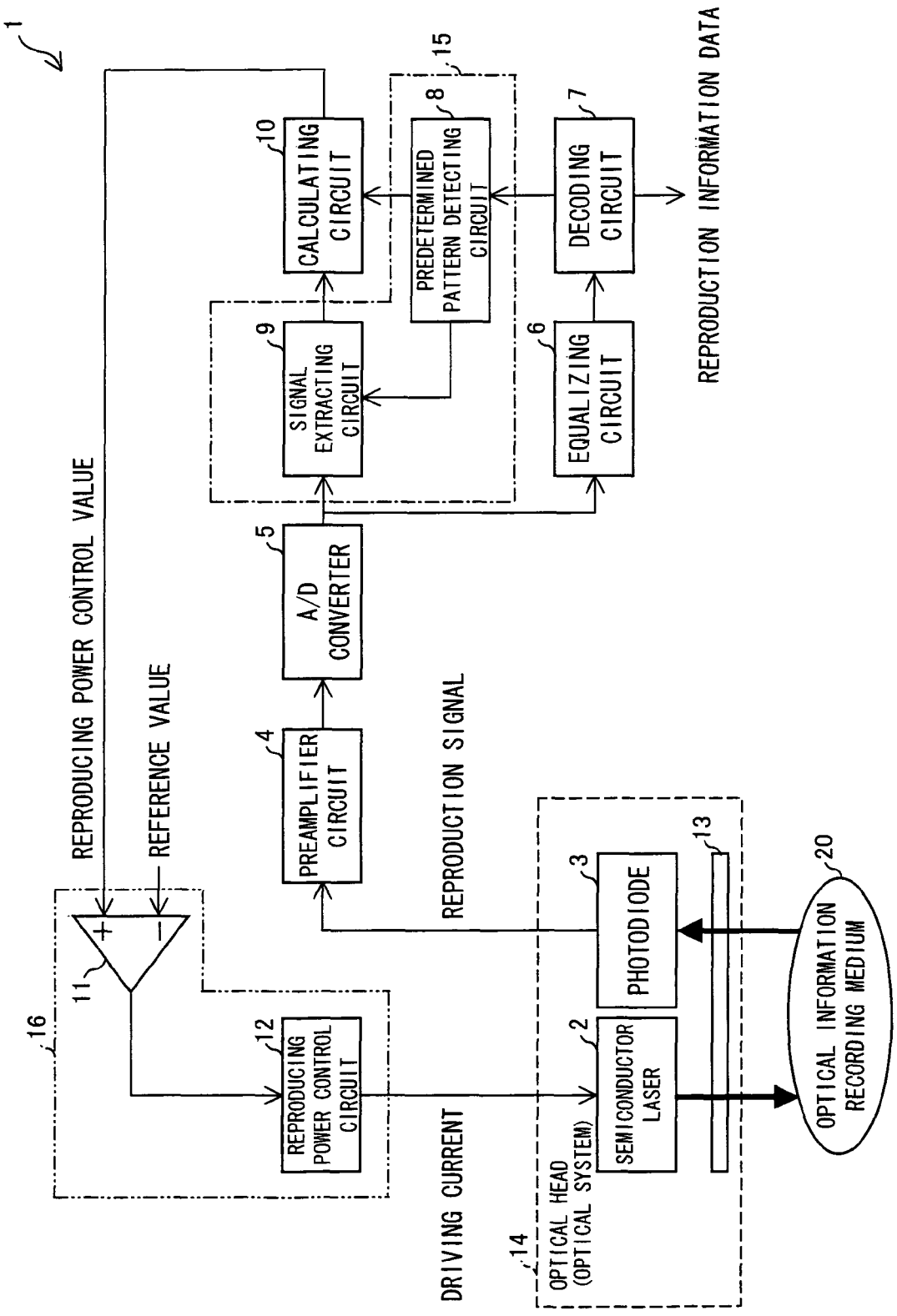
FIG. 1

FIG. 1 is a block diagram illustrating the configuration of an optical information recording medium reproducing apparatus 1 according to the present embodiment.

As illustrated in FIG. 1, the optical information recording medium reproducing apparatus 1 includes an optical head 14 (optical system), a preamplifier circuit 4, an analog-to-digital converter 5, an equalizing circuit 6, a decoding circuit 7, a signal detecting and extracting section 15 (signal extracting section, signal extracting means), a calculating circuit 10 (reproducing power control value finding section, reproducing power control value finding means), and a reproducing power control section 16 (reproducing power control section, reproducing power control means).

The optical information recording medium reproducing apparatus 1 emits, to an optical information recording medium 20, in which marks and spaces formed between any adjacent ones of the marks are recorded as information, laser light of wavelength $\lambda$ through an objective lens 13 having a numerical aperture NA, so as to obtain reproduction signal data from reflected light emitted in response to the laser light.

That is, the optical information recording medium reproducing apparatus 1 reproduces information (recorded information) recorded in the optical information recording medium 20 by emitting laser light to the optical information recording medium 20, and obtains reproducing signal data from the recorded information reproduced. The optical information recording medium 20 includes marks each having a mark length shorter than $\lambda/4NA$, and the optical information recording medium reproducing apparatus 1 can reproduce the marks each of which is included in the optical information recording medium 20 and has a mark length shorter than $\lambda/4NA$.

The optical information recording medium 20 will be described in detail later.

The optical head 14 includes: a semiconductor laser 2 (laser light source) serving as a laser light source which can emit laser light having a wavelength of $\lambda$ nm; a photodiode 3; and the objective lens 13 having a numerical aperture NA. In the present embodiment, the optical head 14 is set to have $\lambda=405$ nm and NA=0.85, which are the same as those for an optical system for Blu-ray Disc®.

The preamplifier circuit 4 adjusts a reproduction signal. The preamplifier circuit 4 acquires a reproduction signal outputted by the photodiode 3. Then, the preamplifier circuit 4 amplifies a signal level of the reproduction signal acquired and removes unnecessary direct current potential, for example, so that the signal level has an appropriate amplification (signal level).

The analog-to-digital converter 5 digitalizes the reproduction signal, outputted by the preamplifier circuit 4, into reproduction signal data. In a case of using e.g., an 8-bit analog-to-digital converter 5, reproduction signal data to be obtained has 256 discrete levels. Further, a clock signal that the analog-to-digital converter 5 utilizes in sampling is supplied from a PLL (Phase Locked Loop) circuit (not illustrated).

The equalizing circuit 6 acquires the reproduction signal data outputted by the analog-to-digital converter 5. Then, the equalizing circuit 6 carries out, on the reproduction signal data acquired, signal processing for correcting an attenuated high frequency component of the reproduction signal data, and outputs it to the decoding circuit 7 as corrected reproduction signal data.

The decoding circuit 7 acquires the corrected reproduction signal data outputted by the equalizing circuit 6. Then, the decoding circuit 7 decodes, according to a predetermined method, the corrected reproduction signal data acquired, so as to convert the corrected reproduction signal into binarized data having two levels (values) of "1" and "0".

Various methods are proposed for the decoding process. Among those, in a case of reproducing an optical disc having a high recording density, PRML (Partial Response Maximum Likelyhood) decoding is commonly used. With the PRML decoding, the decoding process is carried out while considering an intersymbol interference caused by an increased density of information recorded in the optical information recording medium 20. This makes it possible to carry out the decoding process even on reproduction signal data whose signal quality has been degraded due to an intersymbol interference.

The signal detecting and extracting section 15 includes: a predetermined pattern detecting circuit 8 for detecting a predetermined data pattern from reproduction signal data; and a signal extracting circuit 9 for extracting, as extracted reproduction signal data, part of the reproduction signal data which part corresponds to the predetermined data pattern detected.

The predetermined pattern detecting circuit 8 acquires the binarized data outputted by the decoding circuit 7. Then, in a case where the binarized data acquired includes a data pattern matching with the predetermined data pattern, the decoding circuit 7 detects the data pattern matched.

Here, the predetermined data pattern refers to a data pattern including (i) a space which has a space length shorter than $\lambda/4NA$ and is sandwiched between marks each having a mark length of $\lambda/2NA$ or longer and (ii) a mark which has a mark length shorter than $\lambda/4NA$ and is sandwiched between spaces each having a space length of $\lambda/2NA$ or longer (described in detail later).

The predetermined pattern detecting circuit 8 also detects, as the predetermined data pattern, a data pattern including (i) a data pattern defined by a mark having a longest mark length and (ii) a data pattern defined by a space having a longest space length.

Further, the predetermined pattern detecting circuit 8 outputs (i) a Trig signal, which is a timing signal indicative of a timing at which the data pattern is detected, and (ii) a Type signal indicative of the type of the data pattern detected (i.e., the type of the arrangement pattern of "0" and "1").

The signal extracting circuit 9 temporarily stores the reproduction signal data. The reason for this is that since the decoding process carried out by the decoding circuit 7 requires a predetermined period of time, it is necessary to delay the timing at which the reproduction signal data is outputted for a period of time required for the decoding process. The signal extracting circuit 9 extracts, from the reproduction signal data stored therein, reproduction signal data of a predetermined length starting from the Trig signal which is outputted by the predetermined pattern detecting circuit 8 and which corresponds to the predetermined data pattern. Then, the signal extracting circuit 9 outputs, to the calculating circuit 10, the reproduction signal data extracted as extracted reproduction signal data. These processes are carried out on the whole of a data recording region 102 of a sector 100.

The processes carried out by the predetermined pattern detecting circuit 8 and the signal extracting circuit 9 will be described in detail later.

The calculating circuit 10 finds, from the extracted reproduction signal data extracted by the signal extracting circuit 9, a reproducing power control value for controlling a reproducing power of laser light.

The calculating circuit 10 acquires (i) the Type signal outputted by the predetermined pattern detecting circuit 8 and (ii) the extracted reproduction signal data outputted by the signal extracting circuit 9. Then, the calculating circuit 10 finds, from the Type signal acquired and the extracted reproduction signal data acquired, the reproducing power control value (described in detail later).

The reproducing power control section 16 controls a reproducing power based on a comparison between the reproducing power control value and a predetermined reference value or a reference value determined by test-reading of the optical information recording medium 20. The reproducing power control section 16 includes a differential amplifier 11 and a reproducing power control circuit 12.

The differential amplifier 11 acquires (i) the reproducing power control value outputted by the calculating circuit 10 and (ii) the reference value, which is a normalized short mark amplitude value observed at a timing at which reproduction signal characteristics (jitter, bER, etc.) become best. Then, the differential amplifier 11 compares the reproducing power control value acquired with the reference value acquired, and carries out feedback to the reproducing power control circuit 12 so that a difference between the reproducing power control value and the reference value becomes smaller.

Upon acquisition of the feedback given by the differential amplifier 11, the reproducing power control circuit 12 determines a driving current for the semiconductor laser 2, and outputs the driving current to the semiconductor laser 2.

In response to this, the semiconductor laser 2 outputs laser light to the optical information recording medium 20 with a reproducing power corresponding to the driving current acquired. The optical information recording medium reproducing apparatus 1 operates (carries out reproduction) in this manner.

(Optical Information Recording Medium 20)

(a) and (b) of FIG. 2, and FIG. 3 schematically illustrate how the optical information recording medium 20, which is a super resolution medium reproduced by the optical information recording medium reproducing apparatus 1, is arranged.

(a) of FIG. 2 is a view illustrating one example of the predetermined data pattern formed on the optical information recording medium 20 of the present embodiment, and is a view schematically illustrating a relationship between a mark sandwiched by spaces and a laser spot. (b) of FIG. 2 is a view schematically illustrating a relationship between marks and a space, which relationship is the inverse of the relationship shown in (a) of FIG. 2.

FIG. 3 is a view schematically illustrating the configuration of the optical information recording medium 20 in which the marks and the spaces illustrated in (a) and (b) of FIG. 2 are formed.

In the present embodiment, the optical information recording medium 20 is a reproduction-dedicated medium, in which prepits and spaces are recorded as information. The prepit refers to a mark, and the space is formed between the prepits (i.e., the marks).

The optical information recording medium 20 includes (i) a ZnO film of 60 nm in thickness which serves as a super resolution film and (ii) a Ta film of 7 nm in thickness which serves as a reflective film, stacked each other. Further, a prepit string including recording marks (marks) of a length within a range from 2T mark length (or 2T space length)=93 nm to 8T mark length (or 8T space length)=372 nm is formed on the optical information recording medium 20 at a track pitch of 0.32 μm, according to 1-7 RLL modulation.

As illustrated in FIG. 3, the optical information recording medium 20 includes a sector 100 formed therein. The sector 100 is a unit of a recording region of the optical information recording medium 20. The sector 100 includes (i) an address region 100 indicative of where the sector 100 is located and (ii) a data recording region 102 in which information data is recorded.

The signal detecting and extracting section 15 extracts extracted reproduction signal data from the information data recorded in the data recording region 102 provided in the optical information recording medium 20.

The information data herein refers to generally-used information data, examples of which encompass information data such as contents, image information data, and audio information data.

In the 1-7 RLL modulation, a mark length which is shortest (shortest mark length) is 2T, and a mark length which is longest (longest mark length) is 8T.

The predetermined data pattern to be detected by the predetermined pattern detecting circuit 8 is included in the data recording region 102.

That is, the optical information recording medium 20 includes, in the data recording region 102 for recording information data, (i) a space which has a space length shorter than $\lambda/4NA$ and is sandwiched between marks each having a mark length of $\lambda/2NA$ or longer and/or (ii) a mark which has a mark length shorter than $\lambda/4NA$ and is sandwiched between spaces each having a space length of $\lambda/2NA$ or longer.

This eliminates need for providing, in the optical information recording medium 20, a region for recording extracted reproduction signal data. This makes it possible to prevent a reduction in a usage rate of the data recording region 102.

Further, the predetermined pattern detecting circuit 8 can detect the predetermined data pattern in accordance with (i) the space which has a space length shorter than $\lambda/4NA$ and is sandwiched between the marks each having a mark length of $\lambda/2NA$ or longer and/or (ii) the mark which has a mark length shorter than $\lambda/4NA$ and is sandwiched between the spaces each having a space length of $\lambda/2NA$ or longer, each formed in the data recording region 102, which is for storage of information data and is in the optical information recording medium 20.

Therefore, it is not necessary to detect the predetermined pattern from an optical information recording medium having a predetermined place which is not the data storing region and in which a specific pattern for controlling a reproducing power is formed. This provides an optical information recording medium reproducing apparatus 20 having a high versatility.

Instead of the above, the predetermined pattern detecting circuit 8 can detect the predetermined data pattern through general operation for obtaining information data. Note that, the optical information recording medium 20 may be provided with, in a region which is not the data recording region 102, (i) a region for recording the predetermined data pattern and/or (ii) a region where a predetermined data pattern is recorded.

Thus, the predetermined pattern detecting circuit 8 can detect the predetermine data pattern both from (i) an optical information recording medium in which the predetermined data pattern is included in a data recording region 102 and (ii) an optical information recording medium in which the predetermined data pattern is included in a region which is not a data recording region 102, thereby improving versatility of the optical information recording medium reproducing apparatus 1.

In the optical information recording medium 20 of the present embodiment, while a recording mark is being read, a signal level of the reproduction signal drops. Note that the optical information recording medium 20 is not limited to a reproduction-dedicated medium, but may be a rewritable type or a once-write type. Instead, the optical information recording medium 20 may be such an optical information recording medium which causes a signal level of the reproduction signal data which is being read to increase.

Now, a relationship between (i) the optical system of the optical information recording medium reproducing apparatus 1 of the present embodiment and (ii) the mark length and the space length in the optical information recording medium 20 is specifically presented as follows: The size of a laser spot, given by approximately $\lambda/NA$, is 405/0.85=476 nm; a mark length shorter than $\lambda/4NA$ (=119 nm) is 2T (=93 nm) only; a mark length of $\lambda/2NA$ (=238 nm) or longer is any of 6T (=279 nm) to 8T (=372 nm).

Next, FIG. 4 shows that the film configuration including the ZnO film of 60 nm and the Ta film of 7 nm exhibits super resolution characteristics.

FIG. 4 is a graph illustrating how much CNR (Carrier to Noise Ratio) of a 2T (=93 nm) monotone pattern depends on a reproducing power (Pr), in a case where an optical information recording medium having the film configuration including the ZnO film of 60 nm and the Ta film of 7 nm is reproduced by an evaluating apparatus having the same optical system as that of the optical information recording medium reproducing apparatus 1 of the present embodiment. In FIG. 4, the vertical axis represents CNR (dB), and the horizontal axis represents Pr (mW). Note that the 2T monotone pattern refers to a pattern in which 2T marks and 2T spaces are alternated.

As illustrated in FIG. 4, since the 2T mark length is equal to or shorter than the theoretical optical system resolution limit, CNR is very low at a low reproducing power. However, as the reproducing power increases, CNR increases. Thus, FIG. 4 shows that the super resolution effect is expressed.

(Process Performed by Optical Information Recording Medium Reproducing Apparatus 1)

The following describes, with reference to FIG. 1 and FIG. 3, reproducing operation carried out by the optical information recording medium reproducing apparatus 1.

The respective configurations of the reproduction signal data, the binarized data, the Trig signal, and the Type signal will be described in detail later.

Firstly, when light emitted from the semiconductor laser 2 reaches the address region 101 of the sector 100 on the optical information recording medium 20, the reflected light is converted into an electric signal by the photodiode 3, and the electric signal is outputted as a reproduction signal. According to the reproduction signal thus obtained from the address region 101, an address decoder (not illustrated) recognizes a target sector address.

Subsequently, when light emitted from the semiconductor laser 2 is irradiated onto the data recording region 102, the reflected light is converted into an electric signal by the photodiode 3, and the electric signal is outputted to the preamplifier circuit 4 as a reproduction signal. The preamplifier circuit 4 acquires the reproduction signal outputted by the photodiode 3.

Upon acquisition of the reproduction signal outputted by the photodiode 3, the preamplifier circuit 4 amplifies a signal level of the reproduction signal acquired and removes unnecessary direct current potential from the reproduction signal, for example, so that the reproduction signal has an appropriated amplification (signal level). Then, the preamplifier circuit 4 outputs to the analog-to-digital converter 5 the reproduction signal thus adjusted.

Upon acquisition of the adjusted reproduction signal outputted by the preamplifier circuit 4, the analog-to-digital converter 5 digitalizes the adjusted reproduction signal acquired, and outputs it as reproduction signal data to the equalizing circuit 6 and the signal extracting circuit 9.

Upon acquisition of the reproduction signal data outputted by the analog-to-digital converter 5, the equalizing circuit 6 carries out, on the reproduction signal data acquired, signal processing for correcting an attenuated high frequency component of the reproduction signal data. Then, the equalizing circuit 6 outputs to the decoding circuit 7 the corrected reproduction signal data obtained by the correction of the high frequency component of the reproduction signal data.

Upon acquisition of the corrected reproduction signal data outputted by the equalizing circuit 6, the decoding circuit 7 decodes, according to a predetermined method, the corrected reproduction signal data acquired, so as to convert the corrected reproduction signal data into binarized data having two levels (values) of "1" and "0". Then, the decoding circuit 7 outputs to the predetermined pattern detecting circuit 8 the binarized data thus converted. Further, the decoding circuit 7 outputs, as reproduction information data, the binarized data thus converted, so that contents or the like are reproduced through e.g., a modulation decoder (not illustrated).

Upon acquisition of the binarized data outputted by the decoding circuit 7, the predetermined pattern detecting circuit 8 judges whether or not the binarized data acquired matches with the predetermined data pattern.

The predetermined data pattern herein refers to a data pattern including (i) a space which has a space length shorter than $\lambda/4NA$ and is sandwiched between marks each having a mark length of $\lambda/2NA$ or longer and (ii) a mark which has a mark length shorter than $\lambda/4NA$ and is sandwiched between spaces each having a space length of $\lambda/2NA$ or longer.

By using the predetermined pattern, the optical information recording medium reproducing device 1 of the present embodiment can carry out the reproducing power control more accurately and more stably than conventional reproducing apparatuses does. The reason for this will be described later.

The predetermined pattern detecting circuit 8 also detects, as the predetermined data pattern, a data pattern including (i) a data pattern defined by a mark having a longest mark length and (ii) a data pattern defined by a space having a longest space length.

Upon detection of any of the foregoing predetermined data patterns, the predetermined pattern detecting circuit 8 outputs (i) a Trig signal, which is a timing signal indicative of a timing at which the predetermined pattern is detected and (ii) a Type signal indicative of the type of the data pattern detected (i.e., the type of the arrangement pattern of "0" and "1"). The predetermined pattern detecting circuit 8 outputs the Trig signal to the signal extracting circuit 9, and outputs the Type signal to the calculating circuit 10. These processes are carried out on the whole of the data recording region 102 of the sector 100.

Upon acquisition of the reproduction signal data outputted by the analog-to-digital converter 5, the signal extracting circuit 9 temporarily stores the reproduction signal data acquired. Then, upon acquisition of the Trig signal outputted by the predetermined pattern detecting circuit 8, the signal extracting circuit 9 extracts, from the reproduction signal data stored therein, reproduction signal data starting from the Trig signal acquired and corresponding to the predetermined data pattern. Subsequently, the signal extracting circuit 9 outputs, to the calculating circuit 10, the reproduction signal data thus extracted as extracted reproduction signal data. These processes are carried out on the whole of the data recording region 102 of the sector 100.

Upon receipt of the Type signal outputted by the predetermined pattern detecting circuit 8 and the extracted reproduction signal data outputted by the signal extracting circuit 9, the calculating circuit 10 finds a reproducing power control value from the Type signal acquired and the extracted reproduction signal data acquired, and then outputs the reproducing power control value to the differential amplifier 11.

Now, the following specifically describes how a reproducing power control value is found.

The calculating circuit 10 averages (i) signal levels of spaces, extracted from the whole of the data recording region 102, each of which has a space length shorter than $\lambda/4NA$ and is sandwiched between marks each having a mark length of $\lambda/2NA$ or longer, and averages (ii) signal levels of marks, extracted from the whole of the data recording region 102, each of which has a mark length shorter than $\lambda/4NA$ and is sandwiched between spaces each having a space length of $\lambda/2NA$ or longer. Then, the calculating circuit 10 finds a differential value (hereinafter, referred to as "short mark amplitude value") between these averaged values.

Further, similarly, the calculating circuit 10 averages (i) signal levels of spaces, extracted from the whole of the data recording region 102, each of which has a longest space length, and averages (ii) signal levels of marks, extracted from the whole of the data recording region 102, each of which has a longest mark length. Then, the calculating circuit 10 finds a differential value (hereinafter, referred to as "longest mark amplitude value") between these averaged values. Subsequently, the calculating circuit 10 divides the shortest mark amplitude value by the longest mark amplitude value, and outputs a value thus obtained (hereinafter, referred to as "normalized short mark amplitude value") to the differential amplifier 11 as a reproducing power control value.

Upon acquisition of (i) the reproducing power control value outputted by the calculating circuit 10 and (ii) the reference value, which is a normalized short mark amplitude value observed at a timing at which reproduction signal characteristics (jitter, bER, etc.) become best, the differential amplifier 11 compares the reproducing power control value with the reference value acquired, and carries out feedback to the reproducing power control circuit 12 so that a difference between the reproducing power control value and the reference value becomes smaller. Thereafter, upon acquisition of the feedback given by the differential amplifier 11, the reproducing power control circuit 12 determines a driving current (related to a reproducing power of laser light) for the semiconductor laser 2, and outputs the driving current to the semiconductor laser 2. Upon acquisition of the driving current, the semiconductor laser 2 outputs laser light to the optical information recording medium 20.

That is, based on the reproducing power control value and the reference value that the differential amplifier 11 acquires, the driving current for the semiconductor laser 2 is determined. Then, the semiconductor laser 2 emits laser light to the optical information recording medium 20 with a reproducing power corresponding to the driving current thus determined.

(Reference Value)

Next, the following describes the reference value with reference to FIG. 5.

FIG. 5 is a graph illustrating how bER and a normalized short mark amplitude value depend on a reproducing power (Pr), observed in the optical information recording medium 20 of the present embodiment.

The reference value refers to a short mark amplitude value normalized so that characteristics of a reproduction signal become best. The short mark amplitude value normalized so that characteristics of a reproduction signal become best may be (i) one which is obtained by measurement carried out in advance in manufacturing and is recorded in the optical information recording medium 20 or (ii) one which is obtained by measurement in test-reading carried out in e.g., a test-reading region with changing reproducing power before reproduction of the data recording region 102.

As illustrated in FIG. 5, within a range from 1.2 mW to 1.6 mW, the optical information recording medium 20 of the present embodiment has lowest bER, that is, exhibits best reproduction signal characteristics. However, as the reproducing power increases, the normalized short mark amplitude value becomes higher.

Generally, a super resolution medium requires a relatively higher reproducing power so that a super resolution effect is expressed. However, the higher the reproducing power becomes, the more the medium is deteriorated. In view of this, it is preferable that the reproducing power is set as low as possible. The reference value is determined also in consideration of this point.

For example, in the present embodiment, with a margin of approximately 10% from 1.2 mW, which is the lowest value of reproducing power at which bER exhibits a lowest value, the reference value is set to −0.332, which is a normalized short mark amplitude value at 1.3 mW. This reference value may be recorded in advance in its manufacturing, or may be obtained in test-reading.

In this manner, the reproducing power control section 16 controls a reproducing power so that the reproducing power becomes optimum.

(Data Configuration)

Next, the following describes, with reference to (a) through (d) of FIG. 6, the reproduction signal data, the binarized data, the Trig signal, and the Type signal, each described above.

(a) of FIG. 6 shows the configuration of reproduction signal data, and (b) of FIG. 6 shows binarized data obtained by subjecting the reproduction signal data shown in (a) of FIG. 6 to conversion through the decoding process. (c) of FIG. 6 shows the configuration of a Trig signal, and (d) of FIG. 6 shows the configuration of a Type signal.

Note that the reproduction signal data is an output of the analog-to-digital converter 5, as described above.

As shown in (a) of FIG. 6, the reproduction signal data includes D1 through D14. Each of D1 through D14 shown in (a) of FIG. 6 corresponds to 1-bit data. The predetermined data pattern to be detected by the predetermined pattern detecting circuit 8 herein is 00000011000000 (representing a 2T mark sandwiched between 6T spaces; a space is represented by "0", and a mark is represented by "1"), and D1 through D14 correspond to the predetermined data pattern, 00000011000000, which is the predetermined data pattern to be detected by the predetermined pattern detecting circuit 8.

All reproduction signal data that the signal extracting circuit 9 acquires from the data recording region 102 (see FIG. 3) including these D1 through D14 are temporarily stored in the signal extracting circuit 9.

A memory included in the signal extracting circuit 9 operates as a ring buffer, and always stores newest reproduction signal data, which is written over older reproduction signal data.

The decoding circuit 7 decodes each of the reproduction signal data. Consequently, as shown in (b) of FIG. 6, the binarized data is given. Here, a data pattern 00000011000000 is given as the binarized data corresponding to the D1 through D14. The binarized data given is delayed for a period of time required for signal processing carried out by the equalizing circuit 6 and the decoding circuit 7. Here, for the convenience of explanation, such a case is simply shown in FIG. 6 that the delay corresponding to 3 clocks occurs.

Next, the predetermined pattern detecting circuit 8 judges whether or not the binarized data given by the decoding circuit 7 matches with any of the predetermined data patterns to be detected.

The extraction carried out in this manner by using the binarized data, having been subjected to the decoding process by the decoding circuit 7, to judge the presence or absence of any of the determined data patterns to be detected by the predetermined pattern detecting circuit 8 has a higher accuracy than a reproduction signal data extraction carried out by using a timing mark (e.g., a sector mark) as a reference.

Especially, use of PRML decoding reduces the possibility of being affected by an intersymbol interference, and therefore makes it possible to accurately extract reproduction signal data corresponding to a target data pattern, even if a recording density is high.

Here, since 00000011000000 is one of the data patterns to be detected, the Trig signal (see (c) of FIG. 6), which is a signal indicative that the data pattern has been detected, is outputted, and the Type signal (see (d) of FIG. 6), which is a signal indicative of the type of the data pattern extracted, is also outputted.

As one example, the Trig signal is shown as a signal indicative of a timing of the final bit of 00000011000000, and the Type signal representing 00000011000000 is shown as "1".

(Detailed Description of Relationship between Mark Length and Space Length)

Next, the reason for the following is described: In a case where the reproducing power control is carried out on the optical information recording medium 20 including marks each having a mark length shorter than $\lambda/4NA$, the predetermined data pattern is set to the data pattern including (i) a space which has a space length shorter than $\lambda/4NA$ and is sandwiched between marks each having a mark length of $\lambda/2NA$ or longer and/or (ii) a mark which has a mark length shorter than $\lambda/4NA$ and is sandwiched between spaces each having a space length of $\lambda/2NA$ or longer.

Firstly, as described above, the reason why a signal level of a mark and/or a space each shorter than $\lambda/4NA$ is used for the reproducing power control value is that the signal level of a mark and/or a space each shorter than $\lambda/4NA$ changes more greatly depending on the reproducing power than a signal level of a mark and/or a space each longer than $\lambda/4NA$ does, and this enables to control a reproducing power accurately. FIG. 4, illustrating a super resolution effect of the optical information recording medium 20, also shows that characteristics of a mark shorter than $\lambda/4NA$ greatly depend on a reproducing signal.

In the optical information recording medium 20 of the present embodiment, a normalized short mark amplitude value was actually compared with a normalized amplitude value of a mark longer than $\lambda/4NA$. A result of the comparison showed that the normalized short mark amplitude value changed more greatly depending on the reproducing power than the normalized amplitude value of the mark longer than $\lambda/4NA$ does. In view of this, use of a signal level of a mark or a space each shorter than $\lambda/4NA$ for the reproducing power control value allows a reproducing power to be controlled more accurately, in comparison with a case where a signal level of a mark or a space each longer than $\lambda/4NA$ is used for the reproducing power control value.

Next, the following describes a reason why the predetermined data pattern is arranged such that a space is sandwiched between marks each having a mark length of $\lambda/2NA$ or longer or a mark is sandwiched between spaces each having a space length of $\lambda/2NA$ or longer.

As the optical information recording medium 20 has a higher linear recording density i.e., as a shortest mark length of a mark becomes shorter, the reproduction signal quality is more degraded due to an intersymbol interference. With this regard, it is known that, as a recording density becomes higher, the line of an eye pattern generally becomes thicker and a so-called "eye", which is a center part of the eye pattern, becomes smaller. This was confirmed by an experiment.

A comparative medium, which differed from the optical information recording medium 20 of the present embodiment only in a linear recording density i.e., which had a 2T mark length of 150 nm, was prepared. Then, a variation in signal levels of 2T marks was compared between the optical information recording medium 20 and the comparative medium, in terms of a standard deviation σ (a statistic representing the variation).

A result of the comparison showed that the optical information recording medium 20 had a approximately four times greater than a of the comparative medium. Thus, it is shown that the optical information recording medium 20 has a very great variation in the signal levels of the 2T marks. This was caused by an effect of an intersymbol interference, which was occurred because the 2T mark length, which was a shortest mark length of the optical information recording medium 20, was short.

That is, this happened because of the following reason: In the case of the optical information recording medium 20, while a signal level of a 2T mark is being read i.e., while a 2T mark is located at substantially the center of a laser spot, the laser spot includes (i) spaces having various space lengths located ahead of and behind the 2T mark and (ii) marks having various mark lengths located ahead of or behind said spaces.

On the other hand, with the data pattern in which a 2T mark is sandwiched between spaces of $\lambda/2NA$ or longer, however small the 2T mark is, the laser spot includes only the 2T mark and the spaces of $\lambda/2NA$ or longer, located ahead of and behind the 2T mark (see (a) of FIG. 2).

The reason for this is that the laser spot is expressed by approximately $\lambda/NA$. With this effort, the variation, caused by the intersymbol interference affecting the 2T mark, hardly gets worse. In the optical information recording medium 20, an experiment was carried out for actually measuring a of signal levels of 2T marks each of which is sandwiched between spaces of $\lambda/2NA$ or longer. A result of the measurement showed that σ measured was approximately equal to σ measured in 2T marks of the comparative medium, that is, that the variation was improved.

Considering the above, it might be seemed that, as far as a specific pattern within a laser spot is determined (i.e., in the present embodiment, as far as a pattern in which a 2T mark or a 2T space is sandwiched between bit lengths of 6T or longer is fixed), any specific pattern can reduce the effect of the intersymbol interference. However, in the case of an optical information recording medium including marks each having a mark length shorter than λ/4NA or spaces each having a space length shorter than λ/4NA, unless a mark having a mark length shorter than λ/4NA is sandwiched between spaces of λ/2NA or longer or a space having a space length shorter than λ/4NA is sandwiched between marks of λ/2NA or longer, the amount of change in the reproducing power control value which change occurs depending on the reproducing power is small. This makes it impossible to carry out the reproducing power control with a high accuracy. This was confirmed actually, and the result is shown in FIG. 7 and FIG. 8.

FIG. 7 is a graph illustrating how much values obtained through normalization in which differential values between (i) signal levels of respective 2T spaces and (ii) signal levels of respective 2T marks of the following three specific patterns are divided by respective longest mark amplification values depend on a reproducing power (Pr). FIG. 8 is a graph illustrating how much respective values (each represented by "a value along the vertical axis observed at each Pr—a value along the vertical axis observed at 0.6 mW") indicative of the amounts of changes in the respective differential values of the three patterns shown in FIG. 7 depend on a reproducing power (Pr), in a case where the respective values indicative of the amounts of changes are set to 0 at 0.6 mW.

Pattern 1, pattern 2, and pattern 3, each shown in FIG. 7 and FIG. 8, are set to the following patterns:

Pattern 1: A differential value obtained between (i) a signal level of a 2T space in a data pattern including the 2T space sandwiched between 6T marks (data pattern: 11111100111111) and (ii) a signal level of a 2T mark in a data pattern including the 2T mark sandwiched between 6T spaces (data pattern: 00000011000000). This differential value corresponds to a short mark amplitude value of the present embodiment.

Pattern 2: A differential value obtained between (i) a signal level of a 2T space (a signal level of a 2T space represented by "00" in the center) in a data pattern including the 2T space sandwiched between patterns of "a 2T mark—a 2T space—a 2T mark (110011)" (data pattern: 11001100110011) and (ii) a signal level of a 2T mark (a signal level of a 2T mark represented by "11" in the center) in a data pattern including the 2T mark sandwiched between patterns of "a 2T space—a 2T mark—a 2T space (001100)" (data pattern: 00110011001100). This differential value corresponds to an amplitude obtained in a monotone pattern (e.g., one as disclosed in Patent Literature 1).

Pattern 3: A differential value between (i) a signal level of a 2T space of a pattern of "a 6T space—a 2T mark—a 2T space—a 6T mark" (data pattern: 0000001100111111) and (ii) a signal level of a 2T mark of this pattern.

As shown in FIG. 7, the respective differential values of pattern 1 and pattern 3 have minus figures. Thus, it is shown that, with a high density as observed in an optical information recording medium including marks each having a mark length shorter than λ/4NA, a differential value does not have a plus figure due to a strong intersymbol interference, whereas a conventional amplitude value has a plus figure.

Further, FIG. 7 also shows that, in pattern 2, the differential value between the signal level of the 2T space and the signal level of the 2T mark hardly changed even if the reproducing power (Pr) changes.

This result is seemingly contradictory to the result shown in FIG. 4, however, actually is not. This happened because the amplitude observed in the monotone pattern including the mark lengths each shorter than λ/4NA was so small that the amplitude was hidden by noises, for example, and could not be detected.

Furthermore, in the case of pattern 1, the differential value obtained between the 2T space and the 2T mark changed more greatly in response to a change in the reproducing power, in comparison with the case of pattern 3. The reason for this is assumed that, in a specific pattern with which a differential value is decreased due to an intersymbol interference, an effect of a noise and/or the like makes it difficult to detect a change in the differential value which change is caused by a reproducing power.

In view of these, from among patterns in which a mark or a space is sandwiched between bit lengths each corresponding to 6T, selecting pattern 1, with which a 2T space or a 2T mark is least affected by an intersymbol interference, as a specific pattern makes it possible to control a reproducing power accurately.

Therefore, as in the present embodiment, by adopting, as the predetermined data pattern, the data pattern including (i) a space which has a space length shorter than λ/4NA and is sandwiched between marks each having a mark length of λ/2NA or longer and (ii) a mark which has a mark length shorter than λ/4NA and is sandwiched between spaces each having a space length of λ/2NA or longer, it is possible to control a reproducing power so that the reproducing power becomes optimum and to prevent degradation of a reproduction signal quality, even in a case where the environmental temperature changes at the time of reproduction.

It is also considered that the reproducing power control is carried out with use of a reproduction signal quality, for example, bER or jitter. However, in order to carry out the reproducing power control with use of bER, a known wavelength is required as a correct pattern (data pattern to be detected), and although the reproducing power control can be carried out in e.g., a test-reading region, it is impossible to find bER while data information such as contents is being reproduced. On the other hand, the optical information recording medium reproducing apparatus 1 of the present embodiment carries out the reproducing power control while reproducing information data i.e., carries out the reproducing power control in real time. With this, the optical information recording medium reproducing apparatus 1 of the present embodiment can more surely prevent a reduction in a usage rate of the data recording region 102 and can carry out the reproducing power control with a higher accuracy, in comparison with the case where the reproducing power control is carried out with use of bER.

In the case where the reproducing power control is carried out with use of jitter, as described above, and as shown in FIG. 7, an intersymbol interference is strong and jitter significantly gets worse in an optical information recording medium including marks each shorter than λ/4NA. On the other hand, the optical information recording medium reproducing apparatus 1 of the present embodiment can more accurately carry out the reproducing power control, in comparison with the case where the reproducing power control is carried out with use of jitter.

Furthermore, the reproducing power control with use of jitter or bER also has the disadvantage that it is unknown whether increasing or decreasing the reproducing power will give an optimum reproducing power.

In the optical information recording medium reproducing apparatus 1 of the present embodiment, the reproducing power control is carried out with use of the data extracted from the information data recorded in the data recording region 102 shown in FIG. 3. However, the present invention is not limited to this. Instead of this, for example, a test-reading region (not illustrated in FIG. 3) may be provided in the optical information recording medium 20, and a reproducing power may be controlled therein according to the predetermined pattern including (i) a space which has a space length shorter than λ/4NA and is sandwiched between marks each having a mark length of λ/2NA or longer and (ii) a mark which has a mark length shorter than λ/4NA and is sandwiched between spaces each having a space length of λ/2NA or longer.

However, it is preferable that the extracted reproduction signal data is extracted from the information data recorded in the data recording region, since carrying out the reproducing power control while reproducing the information data i.e., carrying out the reproducing power control in real time makes it possible to prevent a reduction in a usage rate of the data recording region and leads to the reproducing power control with a higher accuracy.

In the present embodiment, the normalized short mark amplitude value is used as the reproducing power control value. However, the present invention is not limited to this.

For example, instead of the short mark amplitude, a signal level of a 2T space or a signal level of a 2T mark may be used. However, it is preferable that a differential value between (i) a signal level of a space which has a space length shorter than λ/4NA and is sandwiched between marks each having a mark length of λ/2NA or longer and (ii) a signal level of a mark which has a mark length shorter than λ/4NA and is sandwiched between spaces each having a space length of λ/2NA or longer is used for the reproducing power control value.

A reason for this is as follows: By obtaining a difference between (i) a signal level of a space shorter than λ/4NA and (ii) a signal level of a mark shorter than λ/4NA, it is possible to remove a noise component from the reproducing power control value, and accordingly to carry out the reproducing power control with a higher stability.

In addition, there is another reason for this: In many cases, a differential value between (i) a signal level of a space shorter than λ/4NA and (ii) a signal level of a mark shorter than λ/4NA more greatly changes depending on the reproducing power than a signal level of only a space shorter than λ/4NA or only a mark shorter than λ/4NA does. Therefore, with the difference value, it is possible to carry out the reproducing power control with a higher accuracy.

Further, for example, normalization in which a value is divided by a longest mark amplitude value may not be carried out.

However, it is preferable that a value normalized by a differential value between (i) a signal level of a mark having a longest mark length and (ii) a signal level of a space having a longest space length is used as the reproducing power control value. The reason for this is that such the reproducing power control value makes it possible to prevent a variation, caused by e.g., a film thickness distribution of a material of which the optical information recording medium is made, in signal levels or an amplitude value of a mark and a space each shorter than λ/4NA. This makes it possible to carry out the reproducing power control with a stability. Further, this makes it possible to carry out the reproducing power control with a stability, even in a case where a property of the photodiode, which converts reproducing light into a voltage, changes with time, for example, and a voltage outputted from such the photodiode in response to a certain amount of reproducing light changes.

Furthermore, it is preferable that an asymmetry (a value evaluating an asymmetric property of a reproduction signal) is utilized for the reproducing power control value, in addition to the normalized short mark amplitude value. For example, the asymmetry is defined as follows:

$$ASYM=((LT+LB)/2)-((ST+SB)/2)/(LT-LB),$$

where ASYM: an asymmetry,
ST: a signal level of a space which has a space length shorter than λ/4NA and is sandwiched between marks each having a mark length of λ/2NA or longer,
SB: a signal level of a mark which has a mark length shorter than λ/4NA and is sandwiched between spaces each having a space length of λ/2NA or longer,
LT: a signal level of a mark having a longest mark length, and
LB: a signal level of a space having a longest space length.

By using the asymmetry for the reproducing power control value, in addition to a signal level of a mark or a space each shorter than λ/4NA or an amplitude value of a mark and a space each shorter than λ/4NA, it is possible to carry out the reproducing power control with a higher accuracy. Further, in a case of a super resolution medium in which an asymmetry changes more greatly depending on the reproducing power than a signal level of a mark or a space each shorter than λ/4NA or an amplitude value of a mark and a space each shorter than λ/4NA does, the use of the asymmetry for the reproducing power control value makes it possible to carry out the reproducing power control with a higher stability.

(Program, Computer Readable Recording Medium)

The blocks of the optical information recording medium reproducing apparatus 1, particularly the predetermined pattern detecting circuit 8, the signal extracting circuit 9, and the calculating circuit 10, may be realized by way of hardware or software as executed by a computer as follows:

The predetermined pattern detecting circuit 8, the signal extracting circuit 9, and the calculating circuit 10 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the predetermined pattern detecting circuit 8, the signal extracting circuit 9, and the calculating circuit 10 a computer-readable storage medium containing control program code (executable program, intermediate code program, or source program) for the predetermined pattern detecting circuit 8, the signal extracting circuit 9, and the calculating circuit 10, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The predetermined pattern detecting circuit 8, the signal extracting circuit 9, and the calculating circuit 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. The present invention encompasses a carrier wave or data signal transmission in which the program code is embodied electronically.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

An optical information recording medium reproducing apparatus according to the present invention is suitably applicable to e.g., an optical information recording medium reproducing apparatus for reproducing a super resolution medium in which information is recorded with a high density.

Reference Signs List

1. Optical information recording medium reproducing apparatus
2. Semiconductor laser
3. Photodiode
8. Predetermined pattern detecting circuit
9. Signal extracting circuit
10. Calculating circuit (reproducing power control value finding section, reproducing power control value calculating means)
11. Differential amplifier
12. Reproducing power control circuit
13. Objective lens
14. Optical head
15. Signal detecting and extracting section (signal extracting section, signal extracting means)
16. Reproducing power control section (reproducing power control section, reproducing power control means)
20. Optical information recording medium
$\lambda$ Wavelength
NA Numerical aperture

The invention claimed is:

1. An optical information recording medium reproducing apparatus, comprising: an optical system including (i) a laser light source for emitting laser light having a wavelength of $\lambda$ nm and (ii) an objective lens having a numerical aperture NA, said optical information recording medium reproducing apparatus emitting the laser light to an optical information recording medium, in which marks and spaces formed between any adjacent ones of the marks are recorded as information, so as to reproduce the information recorded and acquire reproduction signal data, said optical information recording medium reproducing apparatus being capable of reproducing the optical information recording medium including marks each having a mark length shorter than $\lambda/4NA$, said optical information recording medium reproducing apparatus, further comprising:

a signal extracting section for detecting a predetermined data pattern from the reproduction signal data, and for extracting, as extracted reproduction signal data, part of the reproduction signal data which part corresponds to the predetermined data pattern detected;

a reproducing power control value finding section for finding, from the extracted reproduction signal data extracted by the signal extracting section, a reproducing power control value for controlling a reproducing power of the laser light; and a reproducing power control section for controlling the reproducing power of the laser light, in accordance with a comparison between the reproducing power control value and a predetermined reference value or a reference value which is determined by test reading of the optical information recording medium, the predetermined data pattern being a data pattern which is defined by (i) a space which has a space length shorter than $\lambda/4NA$ and is sandwiched between marks so as to be adjacent to the marks, the marks each having a mark length of $\lambda/2NA$ or longer and/or (ii) a mark which has a mark length shorter than $\lambda/4NA$ and is sandwiched between spaces so as to be adjacent to the spaces, the spaces each having a space length of $\lambda/2NA$ or longer.

2. The optical information recording medium reproducing apparatus as set forth in claim 1, wherein:

the optical information recording medium has a data recording region in which information data is recorded; and the signal extracting section extracts the extracted reproduction signal data from the information data recorded in the data recording region.

3. The optical information recording medium reproducing apparatus as set forth in claim 1, wherein:

the reproducing power control value finding section finds the reproducing power control value with use of a differential value between (i) a signal level of reproduction signal data obtained from a space which as a space length shorter than $\lambda/4NA$ and is sandwiched between marks each having a mark length of $\lambda/2NA$ or longer and (ii) a signal level or reproduction signal data obtained from a mark which has a mark length shorter than $\lambda/4NA$ and is sandwiched between spaces having a space length of $\lambda/2NA$ or longer.

4. The optical information recording medium reproducing apparatus as set forth in claim 1, wherein:

the signal extracting section extracts, from the reproduction signal data acquired, (i) reproduction signal data of a longest mark having a longest mark length and (ii) reproduction signal data of a longest space having a longest space length; and the reproducing power control value finding section finds the reproducing power control value with use of a value normalized with a differential value between (i) a signal level of the reproduction signal data of the longest mark and (ii) a signal level of the reproduction signal data of the longest space.

5. The optical information recording medium reproducing apparatus as set forth in claim 1, wherein:

the reproducing power control value found by the reproducing power control value finding section is an asymmetric value.

6. A non-transitory optical information recording medium storing a control program for causing an optical information recording medium reproducing apparatus as set forth in claim 1 to operate, the control program causing a computer to function as each of the sections of the optical information recording medium reproducing apparatus.

7. A method for causing an optical information recording medium reproducing apparatus to reproduce an optical information recording medium, said optical information recording medium reproducing apparatus including: an optical system including (i) a laser light source for emitting laser light having a wavelength of $\lambda$ nm and (ii) an objective lens having a numerical aperture NA, said optical information recording medium reproducing apparatus emitting the laser light to an optical information recording medium, in which marks and spaces formed between any adjacent ones of the marks are recorded as information, so as to reproduce the information recorded and acquire reproduction signal data, said method reproducing the optical information recording medium including marks each having a mark length shorter than $\lambda/4NA$, said method comprising the steps of:

(i) detecting a predetermined data pattern from the reproduction signal data, and extracting, as extracted reproduction signal data, part of the reproduction signal data which part corresponds to the predetermined data pattern detected;

(ii) finding, from the extracted reproduction signal data extracted in the step (i), a reproducing power control value for controlling a reproducing power of the laser light; and (iii) controlling the reproducing power of the laser light, in accordance with a comparison between the reproducing power control value and a predetermined reference value or a reference value which is determined by test reading of the optical information recording medium, the predetermined data pattern being a data pattern which is defined by (a) a space which has a space length shorter than $\lambda/4NA$ and is sandwiched between marks so as to be adjacent to the marks, the marks each having a mark length of $\lambda/2NA$ or longer and/or (b) a mark which has a mark length shorter than $\lambda/4NA$ and is sandwiched between spaces so as to be adjacent to the spaces, the spaces each having a space length of $\lambda/2NA$ or longer.

* * * * *